United States Patent [19]

Hörmann

[11] Patent Number: 4,809,745

[45] Date of Patent: Mar. 7, 1989

[54] OIL CONTAINER FOR THE SUPPLY OF HYDRAULIC POWER CIRCUITS

[75] Inventor: Rudolf Hörmann, Dachau, Fed. Rep. of Germany

[73] Assignee: MAN Nutzfahrzeuge GmbH, Munich, Fed. Rep. of Germany

[21] Appl. No.: 118,392

[22] Filed: Nov. 6, 1987

[30] Foreign Application Priority Data

Dec. 18, 1986 [DE] Fed. Rep. of Germany ....... 3643265

[51] Int. Cl.⁴ .............................................. B01D 19/00

[52] U.S. Cl. .................................... 137/574; 137/576; 137/587; 55/186; 55/193

[58] Field of Search ............... 137/262, 264, 390, 571, 137/572, 573, 574, 576, 587

[56] References Cited

U.S. PATENT DOCUMENTS

| | | | |
|---|---|---|---|
| 2,429,280 | 10/1947 | Scully et al. | 137/587 |
| 2,870,786 | 1/1959 | Schroeder | 137/587 |
| 3,574,987 | 4/1971 | Skoli et al. | 55/193 |
| 3,889,705 | 6/1975 | Coderre | 137/574 X |
| 3,977,189 | 8/1976 | Kubik | 137/587 X |
| 4,210,176 | 7/1980 | Emming | 137/587 X |
| 4,359,329 | 11/1982 | Willeitner | 55/186 |
| 4,587,992 | 5/1986 | Thompson | 137/587 X |
| 4,608,062 | 8/1986 | Hughes | 55/193 X |

*Primary Examiner*—John Rivell
*Attorney, Agent, or Firm*—Scully, Scott, Murphy & Presser

[57] ABSTRACT

An oil container for the supply of hydraulic power circuits with a storage function and for receiving oil returned from the circuits. The oil container has storage means and comprises walls and internal partitions constituting a multifunctional system, the partitions defining a collection space adapted when required to accept at least a major part of the oil in the power circuit, an intake space for oil returned from the system, a transition space connected with an outlet of the intake space and separated from the intake space by an oil-permeable partition, a storage space connected with an outlet of the transition space and separated from the transition space by an oil-permeable partition so that the oil is returned into the oil container. The oil returning to the container owing to leakage or by the operation of valves is cooled, calmed, filtered and freed of bubbles on passing through the intake space and the transition space into the storage space. The oil container may if required have means for automatic control of at least the amount of oil in one of the spaces.

10 Claims, 2 Drawing Sheets

OIL CONTAINER FOR THE SUPPLY OF HYDRAULIC POWER CIRCUITS

BACKGROUND OF THE INVENTION

The invention relates to an oil container for the supply of oil to hydraulic power circuits with a storage function, and more particularly for the supply of hydrostatic driving, braking, brake power recovery and actuating devices in vehicles, lifting, conveying and like systems and for receiving the returned oil.

A pump supplies hydraulic oil from such an oil container to the hydraulic power circuits of a device. The oil that is returned to the oil container is leaked or bleed oil or is drained through pressure limiting valves, for instance, from the system. This returned hydraulic oil generally has a raised temperature and may be mixed with air and microscopic particles. Normally the hydraulic oil to be returned to the circuit from the container should not exceed a certain temperature and should be clean and free of bubbles. So far external cooling devices, filters and air traps have been used in this connection. However this leads to a substantial increase in costs and the amount of space required for the unit as such. A further point to be considered is that for repair purposes, for example, it is necessary to let off the oil from a storage means, that forms part of a hydraulic power circuit. For this purpose as well it is generally necessary to have separate containers available.

SHORT SUMMARY OF THE INVENTION

Accordingly one object of the present invention is to so devise an oil container of the type described above that it is not only capable of functioning as an oil reservoir but furthermore is able to fulfill additional functions.

In order to achieve this or other objects appearing herein an oil container of the type described is characterized in that it is designed as a multifunctional unit divided internally by partitions into a plurality of functional spaces including at least a collecting space adapted to accommodate at least a major amount of the internal oil of the system, an intake space for leaked and valve-returned oil, a transition space connected at an output with the latter space and separated from it by an oil-permeable partition, and a storage space connected with the latter space at an output and also separated therefrom by an oil-permeable partition so that oil which is returned into the oil container is cooled, caused to flow steadily, filtered and freed of entrapped air on moving from the intake space via the transition space into the storage space.

The design in accordance with the invention thus constitutes an advantageous way of using a single oil container to cool, filter, calm and free the oil from air so that the storage space of the oil container will then be charged with an optimally prepared oil suitable for return to the hydraulic power circuits. During repairs, for instance, the oil may be let off into the collecting space from the power circuits and more especially be let off into the storage means so that after completion of the repairs it may be returned to the sysfem. This means that there is no need to adopt the complex procedure of letting off the oil into separate receptacles.

Advantageous developments and further features of the oil container in accordance with the invention are defined in the dependent claims.

The following is a more detailed account of the oil container in accordance with the invention with reference to the drawings.

LIST OF THE SEVERAL VIEWS OF THE DRAWINGS

Figure 1:
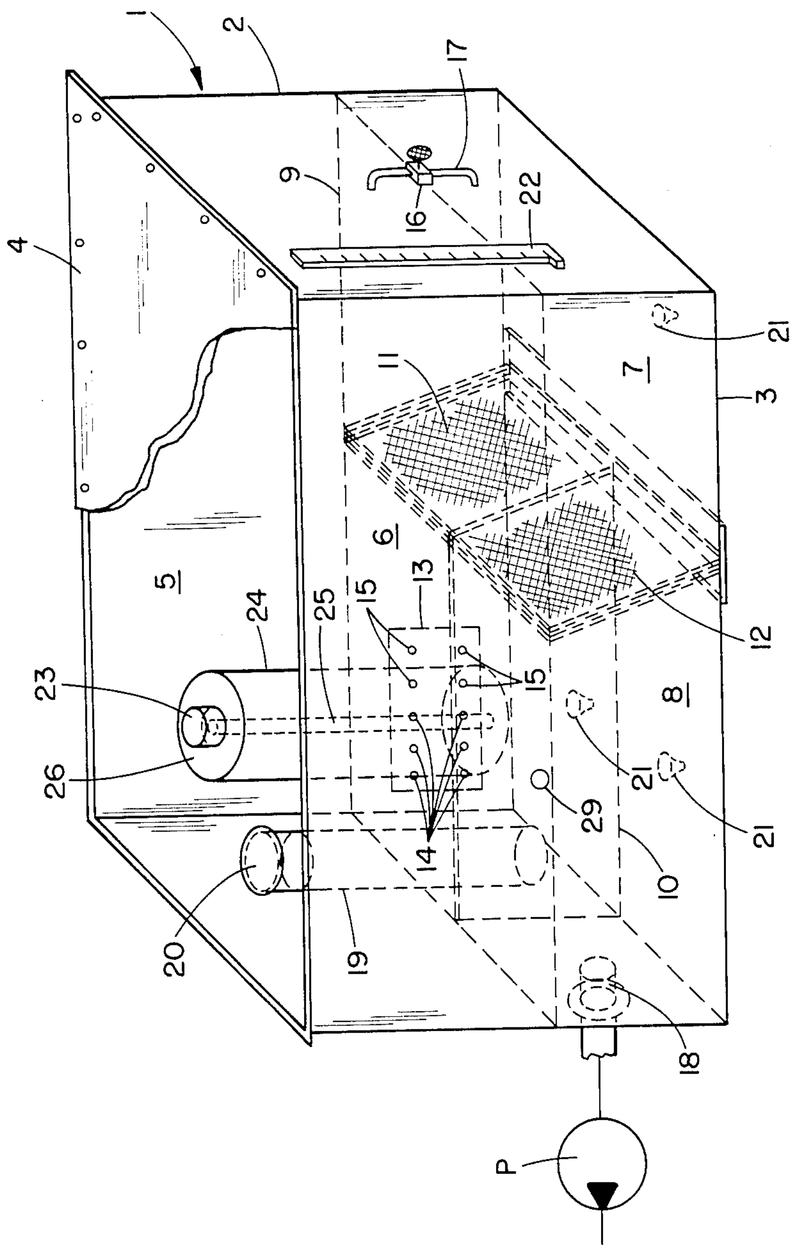
FIG. 1 is a generally diagrammatic perspective view of the oil container by way of example only.
Figure 4:
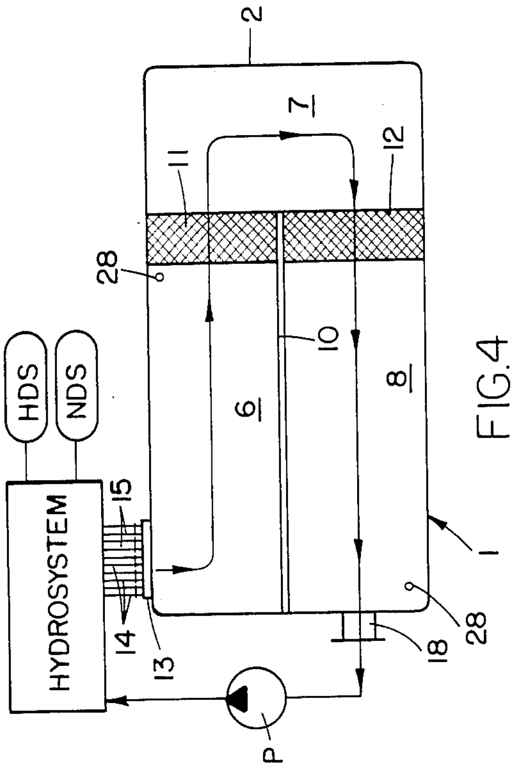

FIG. 4 functionally shows the path of the oil returned to the oil container as in FIG. 1.

Figure 5:
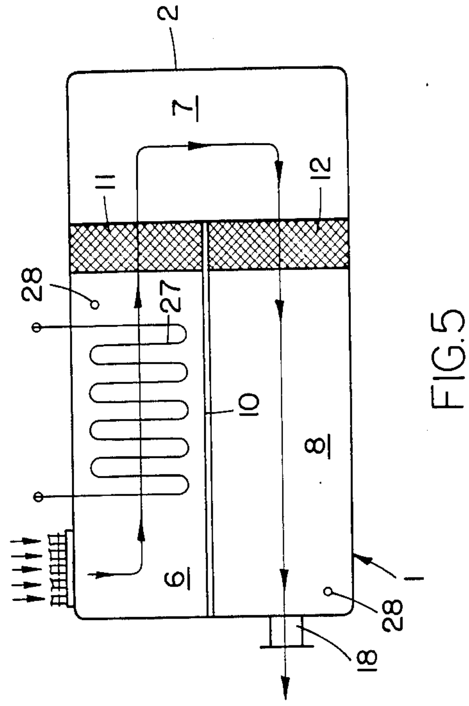
Figure 2:
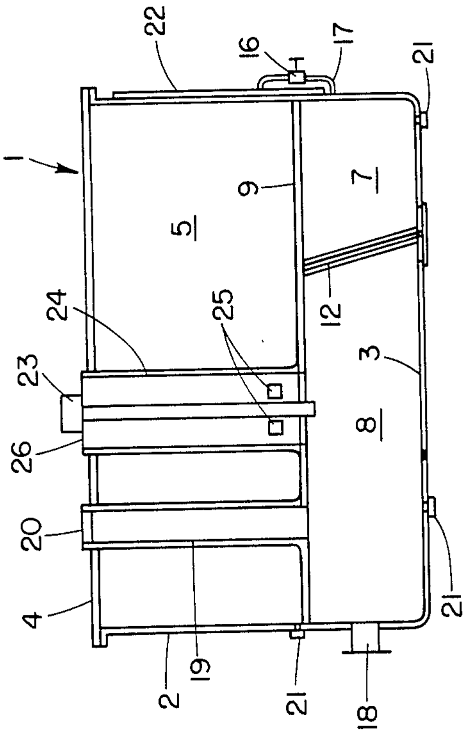
FIG. 2 is a longitudinal section taken through the oil container of FIG. 1.
Figure 3:
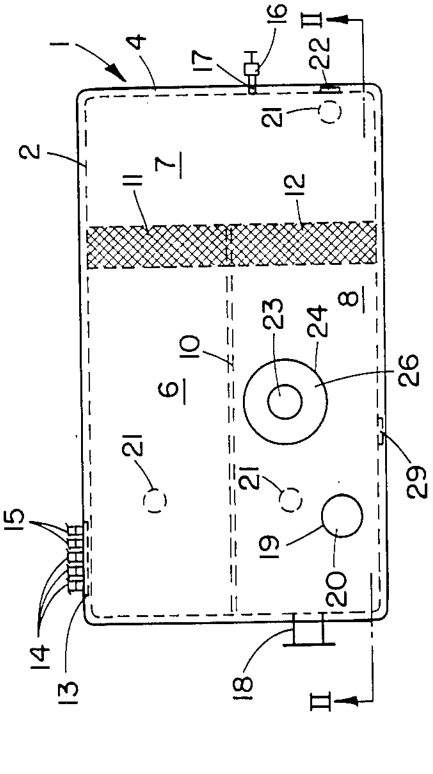
FIG. 3 is a view looking down onto the oil container of FIG. 1.

FIG. 5 shows a possible modification of the oil container of FIG. 1 with means for additionally cooling the oil returned into the container.

DETAILED ACCOUNT OF WORKING EXAMPLE OF THE INVENTION

The oil container referenced 1 in the drawing is connected with a hydraulic system with hydraulic power circuits and one or more hydraulic accumulators (for high (HDS) and low pressure (NDS)), see FIG. 4. This hydraulic system may for example be part of hydrostatic drive devices, braking systems, brake energy recovery systems, actuators in vehicles, as for example in commercial vehicles, lifting, conveying or like arrangements.

The oil container 1 consists of an outer wall 2, a floor 3 and a cover 4. A number of functional spaces are provided in the oil container 1, that is to say a collecting space 5, an intake space 6, a transition space 7 and a storage space 8. These functional spaces are subdivided from each other by partitions to provide internal separation within the container. The collecting space 5, which serves to accommodate at least a major part of the oil within the system, as for instance in the case of a repair being needed, is formed by the use of an intermediate floor 9 forming a partition and which transversely divides up the oil container 1 and in the working example illustrated delimits the collecting space 5 together with the upper container part. In the illustrated design the lower container part is subdivided by an impermeable partition 10 and two oil-permeable end partition 11 and 12 at the ends on both sides for the formation of the intake space 6, the transistion space 7 and the storage space 8. In this respect the partitions 10, 11 and 12 respectively extend from the inner side of the outer wall 2 of the oil container 1 between the oil container floor 3 and the intermediate floor 9. The intake space 6 serves to receive leaked oil and oil returned through operation of the valves in the system, there being an opening with a cover with means, for example in the form of a manifold connection block 13, at the outer wall 2 of the oil container 1 adjacent to the intake space 6 for the connection of leaded oil and returned oil lines 14 and 15. The outlet of the intake space 6 is connected with the transition space 7, from which it is separated by the oil-permeable wall 11. The transition space is connected by a line 17, which may be shut off by a cock or possibly a remote controlled valve, with the collecting space 5. It is in this manner that it is possible for oil to be fed in from the system and for it to be returned into the system internally in the oil container via the transition space 7.

The oil to be let off from the system might however also be supplied directly to the collecting space and possibly returned from the latter and directly fed into the system.

Furthermore the transition space 7 is connected with the storage space 8, the transition space 7 being separated at the outlet from the storage space by the oil-permeable partition 12. The leaked oil is returned into the oil container 1 and the oil let off from the hydraulic power circuits into the container 1 by valve action passes, as is indicated by the schematic of FIG. 4, into the intake space 6 and then flows again through the oil-permeable partition 11 into the transition space 7 and from the latter through the oil-permeable partition 12 into the storage space 8. During this flow the oil fed into the intake space 8 is calmed, cooled, filtered and freed from any air trapped in it. The calming, filtration and removal of air take place on and in connection with the oil-permeable partitions 11 and 12. At the storage space 8 there are means, as for example a tube connector 18 with a connecting flange, on the outer wall 2 of the oil container for producing the connection with a pump P with which oil may be fed from the storage space 8 into the hydraulic power circuits. The storage space is furthermore connected with an oil inlet connector 19 which extends as far as the outer side of the oil container 1 and which in the present example of the invention is secured to the intermediate floor 9, more particularly by welding. It extends upwards out of the oil container 1 where it may be shut by a cover 20 with a venting means. Furthermore some of the spaces and preferably however the spaces 5, 6, 7 and 8 have a screw oil drain plug 21 at a suitable point on the outside of the oil container 1. In addition at least some of the spaces 5, 6, 7 and 8 are provided with indicating instruments to give a reading for the oil level therein. These indicating instruments may be arranged directly on the oil container 1 and/or involve a remote reading system with suitable level sensors arranged on or in the oil container and sensor lines connected therewith. In the present working example of the invention there is a sight glass 22 for the oil level in the transition space 7, a sight glass 29 for the oil level in the collecting space S and a level sensor 23 for the storage space 8. The level sensor 23 with its oil detecting parts 25 is arranged in or on a vertical pipe 24 which is attached to the intermediate floor 9 and extends through the collecting space 5 as far as the topside of the oil container 1. This vertical pipe 24 is provided with a cover 26 on which a level sensor 23 is provided.

The two permeable partitions 11 and 12 are preferably arranged in the oil container so that they may be removed and replaced and in this case may be in the form of push-in pull-out members which may be inserted and removed through suitable openings in the floor 3 or the outer wall 2 of the oil container 1 and are supported on internal guides, this being diagrammatically indicated in the illustrated working example of the invention.

In order to make it possible to clean the spaces 5, 6, 7 and 8 when required in the oil container 1 the latter may be provided with a removable cover 4 as previously stated and also the floor 3 or the outer wall parts may be made removable.

The oil container 1 is arranged at a suitable position in the system to which oil is to be supplied and from which oil is to be removed. Inasfar as the environmental conditions around the oil container 1 and more especially the air around it and the temperature to which it is exposed do not as such ensure sufficient cooling, it is possible to provide a separate cooling system for the container 1, for example as shown in FIG. 5, such system being arranged on the outer and/or inside of the container and taking the form of cooling loops 27 extending through the wall. Generally it is possible for means to be provided at suitable locations, for instance in the intake space 6 and the storage space, for monitoring the oil temperature in the oil container 1, such means for instance being in the form of temperature sensors 28 which are connected with external indicating instruments and possibly automatic controllers for controlling the supply of coolant to the oil container 1.

The oil container thus provides a means suitable for treating the returned oil in practically all necessary respects using simple means. The oil container is uncomplicated in design and may be produced at a low price.

I claim:

1. An oil container for the supply of oil to at least a hydraulic power circuit and receiving oil drained from said circuit, said container having a storage function and comprising walls and internal partitions constituting a multifunctional system, said partitions defining a collection space for accepting at least a major part of the oil in said circuit, an intake space for oil returned from said system, a transition space connected with an outlet of the intake space and separated from the intake space by a first oil-permeable partition, a storage space connected with an outlet of the transition space and separated from the transition space by a second oil-permeable partition so that oil returned into the oil container is cooled, calmed, filtered and free of air inclusions on flowing from the intake space through the transition space and into the storage space, wherein said container further comprises a transverse intermediate floor cooperating with an upper part of the oil container in delimiting the collecting space, whereas a lower oil container part is subdivided into the intake space, the transition space and the storage space by a non-permeable partition and the two oil-permeable partitions terminally adjoining the storage space on both sides, said oil-permeable partitions extending respectively from an inner side of the outer wall of the oil container and between the oil container floor and the intermediate floor.

2. The oil container as claimed in claim 1 comprising indicating instruments for giving level readings for oil in at least some of said spaces.

3. The oil container as claimed in claim 2 wherein said instrments are directly mounted on said oil container.

4. The oil container as claimed in claim 2, wherein said instruments are located remote from said container.

5. The oil container as claimed in claim 1 wherein said outer wall adjacent said intake space is provided with an opening and means thereat for the connection of at least one line for the return of oil from said circuit and wherein said outer wall adjacent to said storage space is provided with connection means for producing a connection with a pump for the supply of oil to the system, said storage space having an oil filling connector extending as far as an outer side of the oil container, at least a major part of the spaces outside of the oil container.

6. The oil container as claimed in claim 1 wherein at least the storage space is connected with a vertical tube accommodating a level sensor.

7. The oil container as claimed in claim 1 wherein said oil-permeable partitions are arranged in the container in such a manner that they may be replaced and are in the form of insertable members which may be moved through suitable openings from the floor or the outer wall of the oil container and are supported on internal guide means in the container.

8. The oil container as claimed in claim 1 comprising means for cooling oil returned to the container, such means being adapted for the external supply of coolant to the oil container and/or the internal passage of coolant to achieve a suitable cooling temperature level.

9. The oil container as claimed in claim 1 comprising a removable cover on a removable floor and/or removable outer wall parts.

10. The oil container as claimed in claim 1 wherein said collecting space is connected with a liquid duct having valve means for shutting it off.

* * * * *

UNITED STATES PATENT AND TRADEMARK OFFICE

CERTIFICATE OF CORRECTION

PATENT NO. : 4,809,745

DATED : March 7, 1989

INVENTOR(S) : Rudolf Hormann

It is certified that error appears in the above-identified patent and that said Letters Patent is hereby corrected as shown below:

Column 2, line 50: "transistion" should read as --transition--

Column 2, line 60: "leaded" should read as --leaked--

Column 4, line 64, Claim 5: "spaces outside of the oil container." should read as --spaces each having an oil drain screw plug arranged at a suitable position on the outside of the oil container.--

Signed and Sealed this

Second Day of July, 1991

*Attest:*

HARRY F. MANBECK, JR.

*Attesting Officer*

*Commissioner of Patents and Trademarks*